(12) United States Patent
Tang

(10) Patent No.: US 10,743,478 B2
(45) Date of Patent: Aug. 18, 2020

(54) NATURAL FIBER FELT AND PRODUCTION METHOD THEREOF

(71) Applicant: Xiaofeng Tang, Changzhou (CN)

(72) Inventor: Xiaofeng Tang, Changzhou (CN)

( * ) Notice: Subject to any disclaimer, the term of this patent is extended or adjusted under 35 U.S.C. 154(b) by 275 days.

(21) Appl. No.: 15/653,495

(22) Filed: Jul. 18, 2017

(65) Prior Publication Data

US 2017/0311556 A1    Nov. 2, 2017

Related U.S. Application Data

(63) Continuation of application No. PCT/CN2015/082910, filed on Jun. 30, 2015.

(30) Foreign Application Priority Data

Apr. 30, 2015   (CN) .......................... 2015 1 0215629

(51) Int. Cl.
| | |
|---|---|
| *A01G 13/02* | (2006.01) |
| *D04H 1/587* | (2012.01) |
| *D04H 1/425* | (2012.01) |
| *D04H 1/68* | (2012.01) |
| *D04H 1/10* | (2006.01) |
| *D04H 3/016* | (2012.01) |
| *D04H 3/045* | (2012.01) |

(52) U.S. Cl.
CPC ..... *A01G 13/0275* (2013.01); *A01G 13/0268* (2013.01); *D04H 1/10* (2013.01); *D04H 1/425* (2013.01); *D04H 1/587* (2013.01); *D04H 1/68* (2013.01); *D04H 3/016* (2013.01); *D04H 3/045* (2013.01)

(58) Field of Classification Search
CPC .. A01G 13/0268; A01G 13/0275; D04H 1/10; D04H 1/425; D04H 1/587; D04H 1/68; D04H 3/016; D04H 3/045
See application file for complete search history.

(56) References Cited

FOREIGN PATENT DOCUMENTS

| | | | |
|---|---|---|---|
| CN | 1243850 | A | 2/2000 |
| CN | 1559176 | A | 1/2005 |
| CN | 101967732 | A | 2/2011 |
| CN | 102560891 | A | 7/2012 |
| JP | 3494404 | B2 | 12/2000 |

*Primary Examiner* — Arti Singh-Pandey
(74) *Attorney, Agent, or Firm* — Erson IP (Nelson IP)

(57) ABSTRACT

A natural fiber felt is provided, which is a film formed by processes of binding a natural fiber net with a binder, extruding, drying and shaping the natural fiber net. A surface of the film is coated with a waterproof layer. The foam binder is formed by combining modified starch serving as a binder and urea serving as a foaming agent with water. A water-repellent agent fruit wax emulsion is employed to form the waterproof layer. The natural fiber net is carded by a carding machine at one time, and the foam binder is sprayed onto the natural fiber net to bind the natural fiber net so as to form the film. The product has characteristics of ultra-thinness and high strength with good performances on heat preservation, moisturizing ability, waterproof and air permeability.

10 Claims, No Drawings

NATURAL FIBER FELT AND PRODUCTION METHOD THEREOF

CROSS-REFERENCE TO RELATED APPLICATIONS

This application is a continuation of International Patent Application No. PCT/CN2015/062910 with a filing date of Jun. 30, 2015, designating the United States, now pending, and further claims priority to Chinese Patent Application No. 201510215629.2 with a filing date of Apr. 30, 2015. The content of the aforementioned applications, including any intervening amendments thereto, are incorporated herein by reference.

TECHNICAL FIELD

The present invention relates to a natural fiber felt and a production method thereof.

BACKGROUND OF THE PRESENT INVENTION

As a great agricultural country, China continuously increases the yield of crops with the development and popularization of the agriculture science and technology. Since the mulching film functions for heat preservation, moisturizing, promoting the growth and development of the crops and increasing the yield, the application of the mulching film as a modern agricultural technology has had a large effect on increasing the yield of the crops, increasing the income of farmers and promoting the development of the agricultural production. However, due to the widespread use of low cost plastic film, and the plastic film is not degradable, bringing the "white pollution" and the soil compaction, permeability deterioration, decreased soil strength and other issues. Therefore, various mulching films which are partially or completely degradable are developed on the market, such as starch-added bio-degradable agricultural mulching film, photodegradable agricultural mulching film, plant fiber mulching film or the like. However, in the currently developed starch-added degradable mulching film, the mass fraction of starch is only about 20% to 30% and only the starch in the starch-added degradable mulching film are degradable, while a majority residues of polyolefin film still exist in porous structure. Thus, the problems of "soil hardening and reduced soil fertility" in the farmland cannot be completely eliminated. The plant fiber mulching film is mainly a paper mulching film. The paper mulching film is completely degradable in the soil, pollution-free and environment-friendly. However, the paper mulching film is low in strength, poor resistance to wind and rain, easy to be damaged, easy to be broken when in laying and unsuitable for mechanical laying. Therefore, in the actual use, the film laying is difficult, time-consuming, labor-consuming and higher in cost. Patent (CN 201010262355.x) entitled "plant fiber non-woven fabric and production method thereof" discloses a bast fiber mulching film and a production method thereof. The method is carding bast fibers through a carding machine to form an initial net and then forming a finial net through an air-laid machine. The bast fiber net immersed in a chemical binder and chemically bonded; a fluorine-containing water repellent is used to perform waterproof treatment; and the net is dried and consolidated at one time to form the film, and finally the film is calendered through a cold calendar and coiled. Since the net forming speed of the air-laid machine is as low as 20 to 25 m/min only, the production efficiency is influenced and the cost is increased in the mass production process. Meanwhile, the chemical binder PVA is incompletely degradable and is gradually deposited in the soil after long-time and repeated use, which may severely damage the soil. By adopting an immersion binding process, the water content of the bast fiber net is high in the immersion process. More energy is consumed during the drying and consolidation process, and the production efficiency and the production cost are severely influenced. Therefore, the disclosed process is complex, excessive procedures are needed, the equipment investment is high (numerous equipment), and the production cost is high. Meanwhile, the bast fiber mulching film cannot be completely degraded and cannot be free of pollution.

SUMMARY OF PRESENT INVENTION

A first objective of the present invention is to provide a natural fiber felt. This product adopts natural fibers, modified starch and fruit wax emulsion as raw materials and auxiliary materials, so that the product is completely degradable and pollution-free, which facilitates the protection of ecological environment and avoids soil hardening. The product has the characteristics of ultra-thinness and high strength with good performances on heat preservation, moisturizing ability, waterproof and air permeability.

A technical solution for realizing the first objective of the present invention is as follows: a natural fiber felt is provided, which is a film formed by processes of binding a natural fiber net with a binder, extruding, drying and shaping the natural fiber net. A surface of the film is coated with a waterproof layer. The natural fiber net is a fiber net formed by carding natural fibers at one time using a carding machine, and the natural fibers are one of linen fibers, ramie fibers, cotton fibers or combinations thereof. The binder is a foam binder which is a mixture of a binder, a foaming agent and water. Every 100 parts by weight of foam binders contain 8 to 10 parts by weight of binders, 1 to 3 parts by weight of foaming agents and the balance being water. The binder is modified starch, and the foaming agent is urea. The waterproof layer is formed by spraying water-repellent fruit wax emulsion onto the surface of the film. The fruit wax emulsion is a CFW-type fruit wax emulsion. The technical characteristics of the natural fiber felt are as follows: a weight per unit area ranges from 30 to 50 g/m$^2$, a thickness ranges from 0.20 to 0.35 mm, the tensile strength ranges from 1400 to 1800 N/m, a tear resistance ranges from 50 to 90 N, a burst strength ranges from 100 to 200 N, and a vertical permeation coefficient ranges from $6.0 \times 10^{-4}$ to $8.0 \times 10^{-4}$ cm/s.

In the above natural fiber felt, the modified starch is oxidized cross-linked starch; and the CFW-type fruit wax emulsion comprises 10 wt % to 20 wt % of natural palm wax, 2.5 wt % to 3.0 wt % of morpholine fatty acid salt and the balance being water.

In the above natural fiber felt, the natural fibers are a combination of 90 wt % of linen fibers and 10 wt % of cotton fibers. The fineness of the linen fibers ranges from 1.5 to 2.5 dtex, the length of the linen fibers ranges from 17 to 25 mm, the fineness of the cotton fibers ranges from 1.5 to 3 dtex, and the length of the cotton fibers ranges from 15 to 35 mm. Alternatively, the natural fibers are a combination of 20 wt % of cotton fibers and 80 wt % of ramie fibers. The fineness of the cotton fibers ranges from 1.5 to 2.5 dtex, the length of the cotton fibers ranges from 16 to 35 mm, the fineness of the ramie fibers ranges from 3 to 6 dtex, and the length of the ramie fibers ranges from 25 to 45 mm. Alternatively, the natural fibers are 100 wt % of flax short fibers, the fineness of the flax short fibers is 0.15 to 0.25 dtex, and the length of the flax short fibers is 17 to 25 mm.

A second objective of the present invention is to provide a method for producing the natural fiber felt. The method is simple, environment-friendly, low in cost and stable in product quality.

A technical solution for realizing the second objective of the present invention is as follows: a method for producing the natural fiber felt comprises the following steps:

a. treatment of raw material fibers: unpacking the raw material natural fibers, mixing and loosening the natural fibers, removing dust and impurities; wherein the natural fibers are one of linen fibers, ramie fibers, cotton fibers or combinations thereof;

b. forming a net: carding the natural fibers obtained in step a at one time using a carding machine to obtain a formed natural fiber net;

c. binding the formed natural fiber net to form a film: spraying a foam binder onto two opposite surfaces of the natural fiber net obtained in step b, and after the spraying, extruding the natural fiber net to form the film; the foam binder is a mixture formed by stirring a binder, a foaming agent and water for 25 to 30 minutes, and every 100 parts by weight of foam binders contain 8 to 10 parts by weight of binders, 1 to 3 parts by weight of foaming agents and the balance being water; the binder is modified starch, and the foaming agent is urea;

d. drying and shaping: drying the film obtained in step c at a temperature ranging from 145° C. to 160° C. for 0.5 to 1 minutes, and then shaping at a temperature ranging from 150° C. to 165° C. for 0.5 to 1 minutes;

e. waterproof treatment: spraying water-repellent fruit wax emulsion onto the two opposite surfaces of the dried and shaped film obtained in step d; and f. calendering finish, coiling and warehousing: performing calendering finish on the film obtained in step a using a cold calender, then cutting to form coils, and warehousing the coils to obtain the natural fiber felt.

According to above method for producing the natural fiber felt, the technical characteristics of the natural fiber felt are as follows: a weight per unit area ranges from 30 to 50 g/m², a thickness ranges from 0.20 to 0.35 mm, a tensile strength ranges from 1400 to 1800 N/m, a tear resistance ranges from 50 to 90 N, a burst strength ranges from 100 to 200 N, and a vertical permeation coefficient ranges from $6.0 \times 10^{-4}$ to $8.0 \times 10^{-4}$ cm/s.

In the above method for producing the natural fiber felt, the modified starch in the step c is oxidized cross-linked starch; and the fruit wax emulsion in step a is the CFW-type fruit wax emulsion which comprises 10 wt % to 20 wt % of natural palm wax, 2.5 wt % to 3.0 wt % of morpholine fatty acid salt and the balance being water.

In the above method for producing the natural fiber felt, the film in steed is dried at a temperature of 150±2° C. for 0.8±0.1 minutes; and then shaped at a temperature of 160±2° C. for 0.7±0.1 minutes.

In the above method for producing the natural fiber felt, the natural fibers in the step a are a combination of 90 wt % of linen fibers and 10 wt % of cotton fibers. The fineness of the linen fibers ranges from 1.5 to 2.5 dtex, the length of the linen fibers ranges from 17 to 25 mm, the fineness of the cotton fibers ranges from 1.5 to 3 dtex, and the length of the cotton fibers ranges from 15 to 35 mm. Alternatively, the natural fibers are a combination of 20 wt % of cotton fibers and 80 wt % of ramie fibers. The fineness of the cotton fibers ranges from 1.5 to 2.5 dtex, the length of the cotton fibers ranges from 16 to 35 mm, the fineness of the ramie fibers ranges from 3 to 6 dtex, and the length of the ramie fibers ranges from 25 to 45 mm. Alternatively, the natural fibers are 100 wt % of flax short fibers. The fineness of the flax short fibers ranges from 0.15 to 0.25 dtex, and the length of the flax short fibers ranges from 17 to 25 mm.

The present invention has the following technical effects: (1) the natural fiber felt in the technical solution of the present invention differs from the existing similar products in that: (i) the foam binder formed by the modified starch serving as the binder, the urea serving as the foaming agent and the water is used to substitute the existing common synthesized macromolecular binder; (ii) the fruit wax emulsion is used to substitute the common fluorine-containing water repellent; and (iii) the natural fibers are carded by a carding machine at one time to form the natural fiber net. In this case, the product not only has the characteristics of ultra-thinness and high strength, but also with good performances on heat preservation, moisturizing ability waterproof and air permeability. The present invention also overcomes the disadvantages of the existing plastic mulching film and various partially or incompletely degradable mulching films that they are hard to be degraded and pollute the environment and soil, and overcomes the disadvantages of the existing paper mulching film that it is low in strength, poor in wind and rain resistance, easy to be damaged, easy to be broken when in laying, unsuitable for mechanical laying, high in laying difficulty, time-consuming, labor-consuming and high in cost; (2) the method for producing the natural fiber felt in the technical solution of the present invention has the following advantages: (i) by adopting the carding machine to card the natural fibers to form the net at one time, not only an air-laid net forming step is saved and equipment investment is reduced, but also the disadvantages that the production efficiency is influenced and the cost is increased due to low net forming speed (only 20 to 25 m/min) of the air-laid machine can be avoided; (ii) the water content of the film formed by spraying the foam binder to bind the natural fiber net is far lower than that of the film obtained by adopting an immersion binding process, so that less energy is consumed during the drying and shaping processes, the production efficiency is high, and the production cost is low; (iii) the modified starch is used to substitute a chemical synthetic binder, and the fruit wax emulsion is used to substitute the fluorine-containing water repellent, so that the raw materials and the auxiliary materials are completely degradable; thus it is more safety and the modern environmentally-friendly requirement can be satisfied; and (iv) each step and technological condition are easy to be controlled, so that stable quality of the natural fiber felt products can be ensured.

DETAILED DESCRIPTION OF PREFERRED EMBODIMENTS

The present invention is further described below in combination with embodiments; however, it is not limited to these embodiments.

Unless otherwise specified, all raw materials used in the embodiments are commercially available industrial products which can be purchased through commercial channels.

Embodiment 1

Specific steps and processes of a natural fiber felt are as follows:

a. treatment of raw material fibers: unpacking the raw material natural fibers, mixing and loosening the natural fibers, and then removing dust and impurities; the natural fibers are 100 wt % of flax short fibers, the fineness of which ranges from about 1.5 to 2.5 dtex, and the length ranges from 17 to 25 mm;
b. forming a net: using a carding machine to carde the natural fibers obtained in step a at one time to obtain a natural fiber net;
c. bonding the net to form a film: holding the natural fiber net obtained in step b by an anti-sticking net to pass through a spraying area, spraying a foam binder onto two opposite surfaces of the natural fiber net using a uniform spray head, and then extruding the sprayed film by a pressure roller to form the film; the foam binder is a mixture formed by stirring a binder, a foaming agent and water for 25 minutes, and every 100 parts by weight of foam binders contain 9 parts by weight of binders, 1 part by weight of foaming agent and the balance being water; and the binder is modified starch oxidized cross-linked starch, and the foaming agent is urea;
d. drying and shaping: holding the film obtained in step c by a supporting net and transporting to a drying device, drying at the temperature of 150° C. for 0.8 min, and then shaping at the temperature of 160° C. for 0.6 min;
e. waterproof treatment: spraying a water-repellent fruit wax emulsion onto the two opposite surfaces of the film obtained in step d; the fruit wax emulsion is a CFW-type fruit wax emulsion; and
f. calendering finish, coiling and warehousing: performing calendaring finish to the film obtained in step e using a cold calender, then cutting to form coils, and warehousing to obtain the natural fiber felt, wherein a breadth of the coil is 200 cm, and length of each coil is 100 m.

The technical characteristics of the natural fiber felt prepared are as follows: a weight per unit area is 35 g/m$^2$, a thickness is 0.28 mm, a tensile strength is 1458 N/m, a tear resistance is 72.8 N, a burst strength is 125.2 N, and a vertical permeation coefficient is $7.12\times10^{-4}$ cm/s.

Embodiment 2

Specific steps and processes of a natural fiber felt are as follows:

While the present embodiment is basically the same as the embodiment 1, the differences are as follows:

The plant fibers used in step a are a combination of 90 wt % of linen fibers and 10 wt % of cotton fibers. The fineness of the linen fibers ranges from 1.5 to 2.5 dtex, the length of the linen fibers ranges from 17 to 25 mm, the fineness of the cotton fibers ranges from 1.5 to 3 dtex, and the length of the cotton fibers ranges from 15 to 35 mm.

For the foam binder used in step c, every 100 parts by weight of foam binders contain 10 parts by weight of binders, 2 part by weight of foaming agent and the balance being water. The binder is modified starch oxidized cross-linked starch, and the foaming agent is urea.

In step d, the film is dried at the temperature of 150° C. for 0.8 min, and then shaped at the temperature of 160° C. for 0.6 min.

The technical characteristics of the natural fiber felt prepared are as follows: a weight per unit area is 40 g/m$^2$, a thickness is 0.32 mm, a tensile strength is 1358 N/m, a tear resistance is 70.9 N, a burst strength is 115.3 N, and a vertical permeation coefficient is $6.80\times10^{-4}$ cm/s.

Embodiment 3

Specific steps and processes of a natural fiber felt are as follows:

While the present embodiment is basically the same as the embodiment 1, the differences are as follows:

The plant fibers used in step a are a combination of 80 wt % of ramie fibers and 20 wt % of cotton fibers. The fineness of the ramie fibers ranges from 3 to 6 dtex, the length of the ramie fibers ranges from 25 to 45 mm, the fineness of the cotton fibers ranges from 1.5 to 2.5 dtex, and the length of the cotton fibers ranges from 16 to 35 mm.

For the foam binder used in step c, every 100 parts by weight of foam binders contain 10 parts by weight of binders, 1 part by weight of foaming agent and the balance being water. The binder is modified starch oxidized cross-linked starch, and the foaming agent is urea.

In step d, the film is dried at the temperature of 150° C. for 1.0 min, and then shaped at the temperature of 160° C. for 0.8 min.

The technical characteristics of the natural fiber felt prepared are as follows: a weight per unit area is 40 g/m$^2$, a thickness is 0.26 mm, a tensile strength is 1539 N/m, a tear resistance is 77.9N, the burst strength is 138.6 N, and a vertical permeation coefficient is $6.86\times10^{-4}$ cm/s.

What is claimed is:

1. A natural fiber felt, which is a film formed by processes of binding a natural fiber net with a binder, extruding, drying and shaping the natural fiber net, wherein a surface of the film is coated with a waterproof layer; wherein the natural fiber net is a fiber net formed by carding natural fibers at one time using a carding machine, and the natural fibers are one of linen fibers, ramie fibers, cotton fibers or combinations thereof; wherein the binder is a foam binder which is a mixture comprises a binder, a foaming agent and water; every 100 parts by weight of foam binders contain 8 to 10 parts by weight of binders, 1 to 3 parts by weight of foaming agents and the balance being water; and the binder is modified starch, and the foaming agent is urea; and wherein the waterproof layer is formed by spraying water-repellent fruit wax emulsion onto the surface of the film.

2. The natural fiber felt according to claim 1, wherein the modified starch is oxidized cross-linked starch; and the fruit wax emulsion comprises 10 wt % to 20 wt % of natural palm wax, 2.5 wt % to 3.0 wt % of morpholine fatty acid salt and the balance being water.

3. The natural fiber felt according to claim 1, wherein the natural fibers are a combination of 90 wt % of linen fibers and 10 wt % of cotton fibers; and the fineness of the linen fibers ranges from 1.5 to 2.5 dtex, the length of the linen fibers ranges from 17 to 25 mm, the fineness of the cotton fibers ranges from 1.5 to 3 dtex, and the length of the cotton fibers ranges from 15 to 35 mm.

4. The natural fiber felt according to claim 1, wherein the natural fibers are a combination of 20 wt % of cotton fibers and 80 wt % of ramie fibers; and the fineness of the cotton fibers ranges from 1.5 to 2.5 dtex, the length of the cotton fibers ranges from 16 to 35 mm, the fineness of the ramie fibers ranges from 3 to 6 dtex, and the length of the ramie fibers ranges from 25 to 45 mm.

5. The natural fiber felt according to claim 1, wherein the natural fibers are 100 wt % of flax short fibers; and the fineness of the flax short fibers ranges from 0.15 to 0.25 dtex, and the length of the flax short fibers ranges from 17 to 25 mm.

6. The natural fiber felt according to claim 1, wherein technical characteristics of the natural fiber felt are as follows: a weight per unit area ranges from 30 to 50 g/m$^2$, a thickness ranges from 0.20 to 0.35 mm, a tensile strength ranges from 1400 to 1800 N/m, a tear resistance ranges from 50 to 90 N, a burst strength ranges from 100 to 200 N, and a vertical permeation coefficient ranges from $6.0 \times 10^{-4}$ to $8.0 \times 10^{-4}$ cm/s.

7. The natural fiber felt according to claim 2, wherein technical characteristics of the natural fiber felt are as follows: a weight per unit area ranges from 30 to 50 g/m$^2$, a thickness ranges from 0.20 to 0.35 mm, a tensile strength ranges from 1400 to 1800 N/m, a tear resistance ranges from 50 to 90 N, a burst strength ranges from 100 to 200 N, and a vertical permeation coefficient ranges from $6.0 \times 10^{-4}$ to $8.0 \times 10^{-4}$ cm/s.

8. The natural fiber felt according to claim 3, wherein technical characteristics of the natural fiber felt are as follows: a weight per unit area ranges from 30 to 50 g/m$^2$, a thickness ranges from 0.20 to 0.35 mm, a tensile strength ranges from 1400 to 1800 N/m, a tear resistance ranges from 50 to 90 N, a burst strength ranges from 100 to 200 N, and a vertical permeation coefficient ranges from $6.0 \times 10^{-4}$ to $8.0 \times 10^{-4}$ cm/s.

9. The natural fiber felt according to claim 4, wherein technical characteristics of the natural fiber felt are as follows: a weight per unit area ranges from 30 to 50 g/m$^2$, a thickness ranges from 0.20 to 0.35 mm, a tensile strength ranges from 1400 to 1800 N/m, a tear resistance ranges from 50 to 90 N, a burst strength ranges from 100 to 200 N, and a vertical permeation coefficient ranges from $6.0 \times 10^{-4}$ to $8.0 \times 10^{-4}$ cm/s.

10. The natural fiber felt according to claim 5, wherein technical characteristics of the natural fiber felt are as follows: a weight per unit area ranges from 30 to 50 g/m$^2$, a thickness ranges from 0.20 to 0.35 mm, a tensile strength ranges from 1400 to 1800 N/m, a tear resistance ranges from 50 to 90 N, a burst strength ranges from 100 to 200 N, and a vertical permeation coefficient ranges from $6.0 \times 10^{-4}$ to $8.0 \times 10^{-4}$ cm/s.

* * * * *